(12) United States Patent
Fasold

(10) Patent No.: US 10,044,051 B2
(45) Date of Patent: Aug. 7, 2018

(54) HUMIDIFIER, IN PARTICULAR FOR A FUEL CELL

(71) Applicant: MANN+HUMMEL GMBH, Ludwigsburg (DE)

(72) Inventor: Michael Fasold, Auenwald (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 516 days.

(21) Appl. No.: 14/750,474

(22) Filed: Jun. 25, 2015

(65) Prior Publication Data

US 2015/0380751 A1  Dec. 31, 2015

(30) Foreign Application Priority Data

Jun. 27, 2014 (DE) .................. 10 2014 009 329

(51) Int. Cl.
*B01F 3/04* (2006.01)
*H01M 8/04* (2016.01)
*H01M 8/04119* (2016.01)
*B01D 63/08* (2006.01)

(52) U.S. Cl.
CPC .......... *H01M 8/04149* (2013.01); *B01F 3/04* (2013.01); *B01F 3/04007* (2013.01); *H01M 8/04141* (2013.01); *B01D 63/082* (2013.01)

(58) Field of Classification Search
CPC .. B01F 3/04; H01M 8/04141; H01M 8/04149
USPC ................................ 261/101, 102, 104, 107
See application file for complete search history.

(56) References Cited

U.S. PATENT DOCUMENTS

| | | | |
|---|---|---|---|
| 7,258,329 B2 | 8/2007 | Sasamoto | |
| 8,919,746 B2 * | 12/2014 | Vanderwees ...... | H01M 8/04074 261/102 |
| 2010/0019400 A1 | 1/2010 | Robb et al. | |
| 2015/0014232 A1 | 1/2015 | McGinnis | |
| 2015/0171442 A1 | 6/2015 | Fasold et al. | |
| 2015/0171445 A1 | 6/2015 | Fasold et al. | |

* cited by examiner

Primary Examiner — Robert A Hopkins
(74) Attorney, Agent, or Firm — James Hasselbeck

(57) ABSTRACT

A humidifier has a stack unit has a plurality of water-vapor-permeable membranes which are arranged placed above one another and spaced apart from one another. Two directly adjacent membranes are connected at a first edge region in a flow-tight manner, and at a second, angularly offset edge region, they are arranged between sealing strips which are placed one above the other and between which flow openings are formed.

16 Claims, 4 Drawing Sheets

HUMIDIFIER, IN PARTICULAR FOR A FUEL CELL

TECHNICAL FIELD

The invention relates to a humidifier which may be used in humidifying air for a fuel call, as well as in other applications.

BACKGROUND

Known from DE 10 2009 034 095 A1 is a humidifier for a fuel cell which comprises a membrane stack including a plurality of membranes which arranged one above the other and spaced apart from one another and between which flow channels are arranged. The membranes are designed to be water-vapor-permeable and enable water molecules to pass over from moist air, which is guided between two membranes, to a flow of dry air in an adjacent flow channel which thereby is enriched with moisture. The moistened airflow is fed to a fuel cell system in which electricity is generated as a result of an electrochemical reaction.

In the stack, the membranes are connected in their edge regions to frame parts, wherein a sealing element for flow-tight closure is arranged between the frame parts of adjacent membranes. The dry or moist air flows crosswise through flow channels which are arranged one above the other and between in each case one membrane is placed. The frame parts and the sealing elements therebetween also serve as spacers through which the membranes clamped in parallel are kept spaced apart from one another.

SUMMARY OF THE INVENTION

It is an object of the invention to provide a humidifier of a structurally simple design that operates efficiently, which is used for a fuel cell, for example.

By means of the humidifier according to the invention, the flowing air which, for example, is fed to a fuel cell for the electrochemical reaction, can be enriched with moisture until a required minimum moisture content in the air flow is reached. The humidifier has a stack of preferably parallel membranes which are spaced apart from one another and are in each case permeable to water, but not to air, so that exclusively a water exchange from an air flow having a high moisture level to the air flow having a lower moisture level takes place, wherein the latter is fed to the fuel cell, for example. The stack unit comprises at least water-permeable or water-vapor-permeable membranes, but preferably more than two membranes, optionally several dozens of parallel membranes that are spaced apart from one another. Between in each case two membranes, a flow channel is formed through which an airflow is guided parallel to the membrane plane and through the stack unit.

In each case two directly adjacent membranes are connected to one another in a flow-tight manner at a first edge region so that no inflow or outflow of fluid is possible through this edge region. The edge region which is closed in a flow-tight manner defines a flow path parallel to the edge region and through the stack unit.

Sealing strips, between which the membranes are placed, which are connected to the first edge region in a flow-tight manner are arranged one above the other at a second edge region angularly offset relative to the first edge region. A plurality of sealing strips are positioned one above the other in the stack unit, wherein flow openings are formed in each case between two sealing strips placed one above the other. These flow openings enable supply and discharge of the fluid.

For each layer in the stack unit having in each case two membranes, only one sealing strip is required on opposing edge regions. The sealing strips ensure at the same time secure fastening of the membranes on the sealing strip side in that the membranes can be clamped at the edge between the sealing strips or can be directly and fixedly connected to the sealing strips. Two membranes are placed between two sealing strips stacked one above the other, one of which membranes is connected, for example, to a sealing strip, for example by adhesive bonding, and the second membrane is only loosely clamped at the edge between two sealing strips placed one above the other. However, it is also possible to fixedly connect the second membrane as well to one of the sealing strips, in particular by welding. For adhesive bonding, an adhesive tape can be affixed onto a sealing strip side, on the exposed side of which the membrane is affixed.

The flow opening, which is formed between two sealing strips placed one above the other, is preferably implemented in that the sealing strips have a cross-sectional profile that is tapered towards the center of the flow channel, wherein the tapering is preferably formed only on one side of the sealing strip, whereas the opposite side of the sealing strip is preferably provided with a planar surface. A sealing strip thus has a planar lateral surface and an uneven, i.e., contoured, lateral surface. Thus, during stacking, a sealing strip is placed with its downwardly oriented tapering profile onto the planar top surface of a sealing strip situated therebelow, for example. The flow opening is formed here between the planar top surface of the sealing strip therebelow and the tapering contour of the sealing strip placed on top of the sealing strip.

The sealing strips preferably have a tapered cross-section only in a middle section, whereas the cross-section increases again towards the two front ends so that the sealing strip is formed in a bridge-like manner. This makes it possible that the sealing strips rest against one another in their front region and that the desired flow opening is formed in the middle section.

According to an advantageous embodiment, spacers are inserted between two membranes placed one above the other, which spacers serve for keeping a set spacing in order to ensure the desired flow channel. The flow through the stack unit usually occurs with flows of different pressure, wherein the fluid in the fluid channel in which the spacers are arranged may have a lower pressure than the flow on the respective opposite membrane side. The spacers ensure that despite the pressure difference in the flow channels arranged one above the other, the membranes do not rest against one another, but instead the flow channel is kept open.

The spacers can form a continuous spacer grid. Furthermore, the spacers can have a flow-guiding function in order to guide the flow in the channel, in which the spacers are arranged, in a target-oriented manner from the inflow side to the outflow side in the channel. For example, it is possible to arrange the inflow and outflow sides offset to one another in the channel and to additionally guide the flow from the inflow side to the outflow side by means of the spacers.

According to another advantageous embodiment, a form-fitting contour is incorporated in the front end of the sealing strip, which form-fitting contour serves for connecting the sealing strip to the housing in which the stack unit is inserted. The form-fitting contour on the sealing strip of the front end is assigned a mating contour on the inner wall of the housing, said form-fitting contours engaging with one another. The form-fitting contour on the front end of the sealing strip is configured, for example, as a groove in which a corresponding form-fitting projection on the inner housing wall engages according to the tongue-and-groove principle. The groove on the front end preferably extends in the vertical direction so that the sealing strips stacked one above the other have a continuous groove at the front ends, which extends over the entire height of the stack unit. A correspondingly formed counterpart on the inner housing wall can engage in the continuous groove.

At the closed edge region, which is angularly offset to the edge region with the sealing strips, the membranes can be enclosed, at least in sections, by a frame or an enclosing part, wherein the enclosing parts of membranes placed one above the other are directly connected to one another in a flow-tight manner. The enclosing parts therefore assume multiple functions: the membranes are stabilized and held in their edge region by the enclosing parts and, moreover, membranes placed above the other in the stack unit are connected to one another via the enclosing parts. Furthermore, the enclosing parts serve for sealing the lateral region of the flow path or channel between two membranes arranged in parallel. A sealing element for sealing the flow channel can be omitted in this area. Rather, the task of the sealing element is additionally undertaken by the directly adjoining enclosing parts, which are connected to one another in a flow-tight manner. This allows a structurally simple design with a reduced number of parts without limiting functionality.

The enclosing part can comprise, for example, two foils which enclose the membranes in the lateral region and are connected to one another by laminating, for example. The two foils enclose between them the lateral region of the membranes and together form a laminated flat membrane, wherein adjacent flat membranes are connected to one another in a flow-tight manner and without sealing element therebetween.

A support or screen grid can be welded between a foil and the membrane, at least on one side. The support grid advantageously covers at least 30% of the membrane area.

Optionally, a foil can have a waffle profile, for example with a pyramid structure, at least on one side, wherein the waffle profile extends over the region in which the foils overlap with the membrane so that at least mechanical anchoring or interlocking between the foil material and the membrane is achieved in the case of membrane materials that are not welded together.

By using an additional grid on the side opposite the waffle profile, which grid preferably has the same dimensions as the membrane, the additional grid can be welded to one of the foils during the welding process. Furthermore, additional mechanical fixation in the membrane is achieved by the grid or the webs of the grid.

The flow through the stack unit preferably takes place crosswise in the flow channels which are arranged one above the other and which are formed in each case between the membranes.

BRIEF DESCRIPTION OF THE DRAWINGS

Further advantages and expedient embodiments can be found in the further claims, the description of the figures and the drawings. In the figures:

In the figures, the same components are designated by the same reference signs.

DETAILED DESCRIPTION OF PREFERRED EMBODIMENTS

Figure 1:
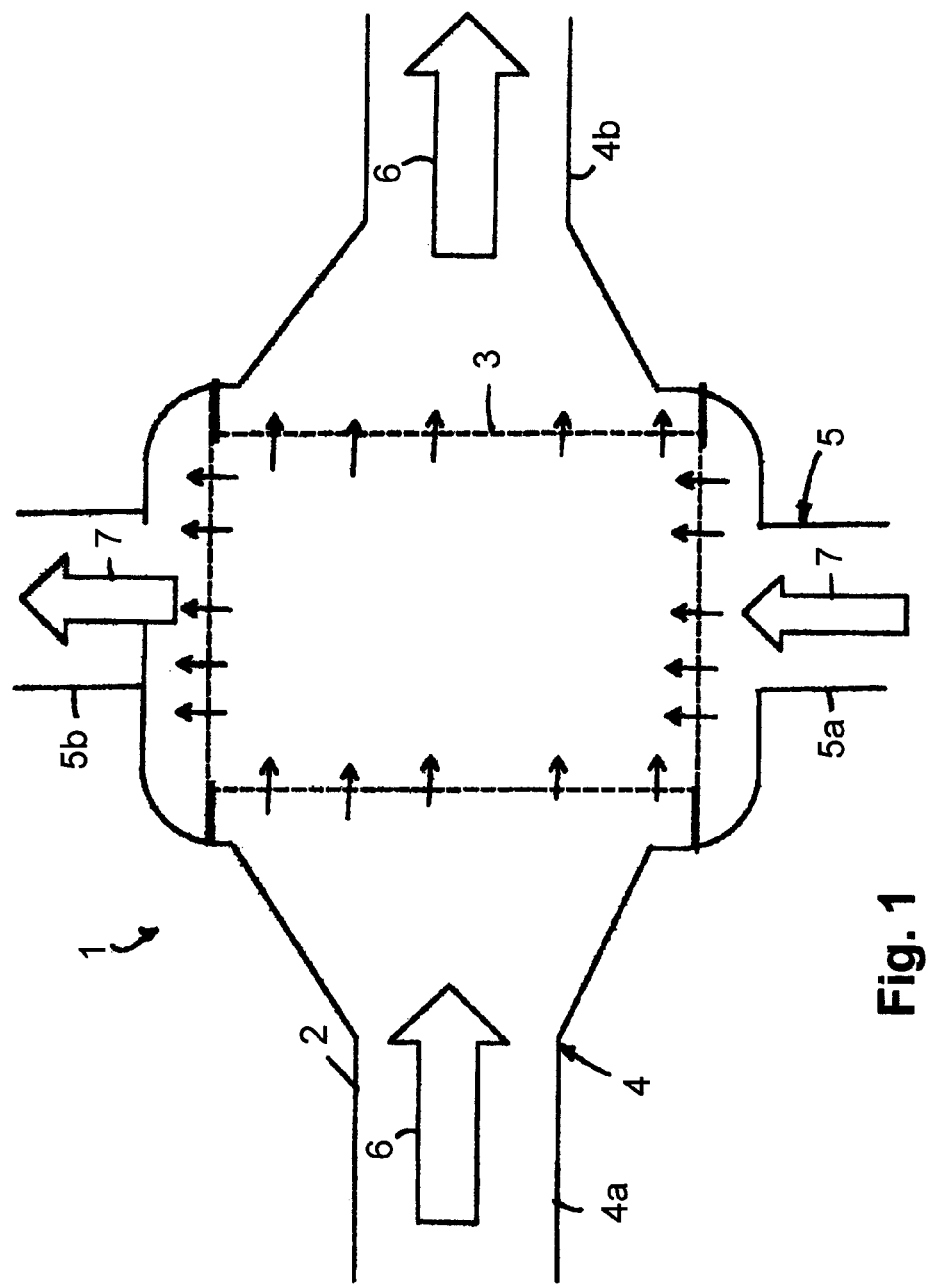
FIG. 1 shows a humidifier for a fuel cell having a cartridge inserted into a housing, the cartridge containing a plurality of water-vapor-permeable membranes which are stacked one above the other and form a stack unit.

In FIG. 1, a humidifier 1 for a fuel cell is illustrated, via which fresh air enriched with moisture and having a minimum moisture level is fed to the fuel cell. In a housing 2, the humidifier 1 has a replaceably inserted cartridge 3, which serves for transmitting the moisture contained in an exhaust gas flow to a dry fresh air flow, which is fed to the fuel cell. The cartridge 3 has a stack unit comprising a plurality of water-vapor-permeable membranes stacked one above the other.

The housing 2 of the humidifier 1 is provided with a fresh air channel 4 via which ambient air is supplied as fresh air. The fresh air channel 4 comprises a feeding section 4a upstream of the cartridge 3 and a discharging section 4b downstream of the cartridge.

The housing 2 is provided with an exhaust gas channel 5 which is offset at an angle of 90° relative to the fresh air channel 4 and via which exhaust gases of the fuel cell, which are enriched with moisture, are guided through the cartridge. The exhaust gas channel 5 has a feeding section 5a upstream of the cartridge 3 and a discharging section 5b downstream of the cartridge.

The fresh air flow 6 and the exhaust gas flow 7 intersect according to the orientation of the channels 4 and 5 at an angle of 90°; however, the air flows 6 and 7 within the cartridge 3 are separated by the water-vapor-permeable membranes, which only permit water exchange from the exhaust gas flow 7 laden with a high level of moisture to the dry fresh air flow 6.

Figure 2:
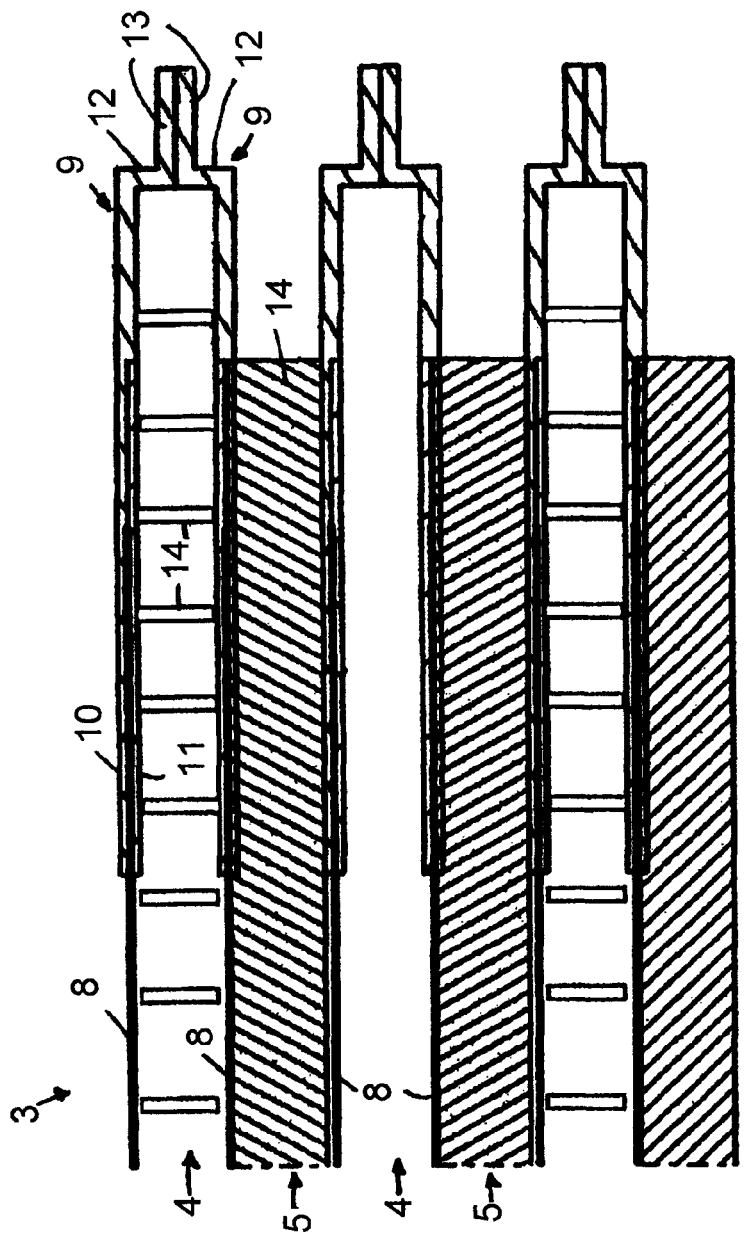
FIG. 2 shows a cross-section of a stack unit having membranes that are enclosed in the lateral region or edge region by enclosing parts which are connected to one another.

FIG. 2 shows a cartridge 3 in a cross-sectional view. The cartridge 3 comprises a stack unit having a plurality of parallel membranes 8 which are arranged one above the other and spaced apart from one another, each of which are water-vapor-permeable, but do not permit air to pass through. The flow chambers or channels for guiding the fresh air flow and the exhaust gas flow therethrough extend in each case between two membranes 8. The fresh air channels 4 and the exhaust gas channels 5 alternate between the membranes 8 in the direction as they are arranged one above the other.

Each membrane 8 is enclosed in its edge region by an enclosing part 9 comprising two foils 10 and 11, which are connected to one another by laminating or welding, e.g. ultrasonic welding. One foil 10 lies on one side of the edge region of the membrane 8 and the second foil 11 lies on the opposite side of the membrane 8. The enclosing part 9 is formed by the edge region of the membranes 8 with the foils connected by laminating or welding.

Laterally outside of the membrane 8, the enclosing part 9 can form a profile section 12 which is formed to be angular or cranked and has a contact region 13 that extends parallel and offset to the plane of the membrane 8. As an alternative, the enclosing part 9 can also be formed to be flat or without a defined profile section and thus extends approximately parallel to the plane of the membrane 8. The contact regions 13 of adjacent enclosing parts 9 contact one another other and are connected to one another in a flow-tight manner. The contact regions 13 rest directly against one another; a sealing element or any other component therebetween is not required. Each of the contact regions 13 is formed to be flat and extends with parallel spacing to the membrane plane so that, on the hand, the spacing between adjacent membranes 8 is bridged via the profile section 12 and, on the other, the contact regions 13 arranged on top of one another rest against one another with a comparatively large surface area, which supports a flow-tight connection. The connection is implemented by welding, for example.

Since the fresh air channels 4 and the exhaust gas channels 5 extend offset to one another at an angle of 90°, the edge regions of the membranes 8 are accordingly also provided with enclosing parts 9 which are offset at an angle of 90° and which seal the corresponding front ends at the channels. However, at each of the front ends of a channel arranged offset by 90°, there is no enclosing part; this front end is formed to be open for the inflow and/or outflow of air.

In the spaces between the membranes 8, which form the fresh air channels 4 and the exhaust gas channels 5, spacers 14 are inserted which extend directly between the membranes 8 and keep the membranes at a defined spacing from one another.

Figure 3:
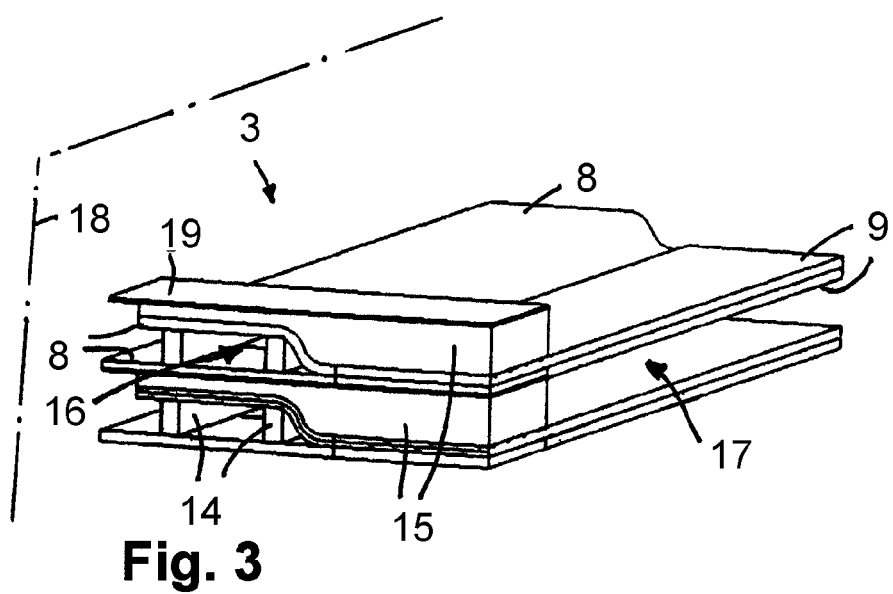
FIG. 3 shows a stack unit in a perspective view, with sealing strips which are placed one above the other and between which flow openings are formed.
Figure 4:
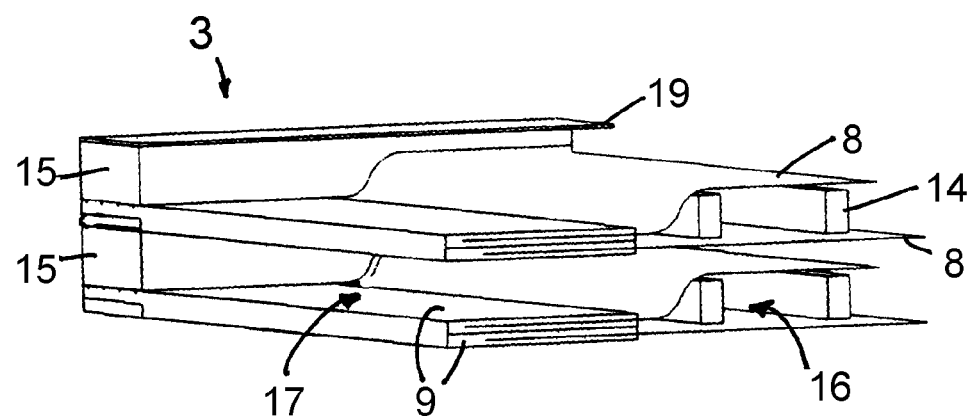
FIG. 4 shows the stack unit according to FIG. 3 from another perspective view.

In the FIGS. 3 and 4, the cartridge 3 with the stack unit is illustrated in each case in a perspective view. As described above, in each case two directly adjacent membranes 8 are joined together in a flow-tight manner in the edge region with the enclosing parts 9. In the edge region angularly offset by 90° to this edge region, sealing strips 15 are stacked one above the other, wherein two membranes 8 are arranged between in each case two sealing strips 15. Each of the sealings strips 15 is contoured and has a tapering cross-sectional profile, as a result of which in each case one flow opening 16 is formed in the middle section of the sealing strips 15, which flow opening leads to a flow channel between adjacent membranes 8 in which the spacers 14 are inserted. Crosswise to the flow channels into which the flow is fed through the flow openings 16, further flow channels having flow openings 17, which lie between the closed edge regions with the enclosing parts 9, extend on the respective opposite sides of the membranes 8. At the same time, these flow channels having the flow openings 17 are laterally bordered in a flow-tight manner by the sealing strips 15. Fluid at lower pressure is fed through the flow channels having the flow openings 16, whereas fluid at higher pressure is fed through the flow channels having the flow openings 17. Due to the spacers 14 in the flow channels having the flow openings 16, the membranes are prevented from collapsing despite the lower pressure, and the flow channel is maintained.

Figure 5:
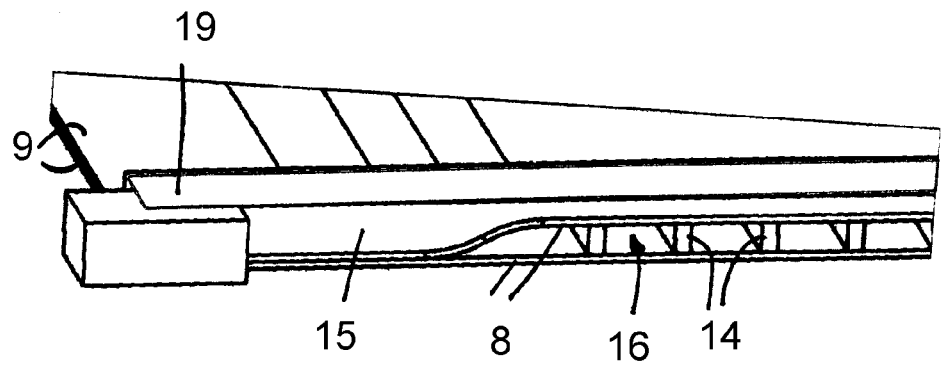
FIG. 5 shows a detail of a stack unit with a view on the front end of the sealing strip.

FIGS. 3, 4 and 5 each only show a cut-out of the stack unit of the cartridge, which is formed symmetrically to a symmetry plane 18. Accordingly, the sealing strips 15 are configured in a bridge-like manner having a planar top side and a contoured, i.e., uneven bottom side, wherein the cross-section is tapered in the middle section of the sealing strip so as to form the flow opening 16.

The stack unit of the cartridge is also configured symmetrically with respect to a further symmetry plane rotated by 90°, so that sealing strips 15 are arranged in each case at diametrically opposing edge regions.

An adhesive layer 19, which is adhesive on both sides, is applied onto the planar top side of each sealing strip 15. The adhesive layer 19 adheres to the planar top side of the sealing strip 15 and, at the same time, a membrane 8 is adhered in the edge region via the adhesive layer 19 to a sealing strip 15 lying therebelow.

The further membrane 8, which likewise is arranged between two adjacent sealing strips 15 and which is fed along the contoured bottom side of a sealing strip 15, is not adhesively bonded to a sealing strip, but is welded to a sealing strip. The sealing strips 15 are placed laterally one above the other and clamp the membranes 8 including the enclosing part 9 between them, including the non-adhered welded membrane. The non-adhered welded membrane 8 including the enclosing part 9 is held at the contoured bottom side of the sealing strip 15 via the spacers 14.

Figure 6:
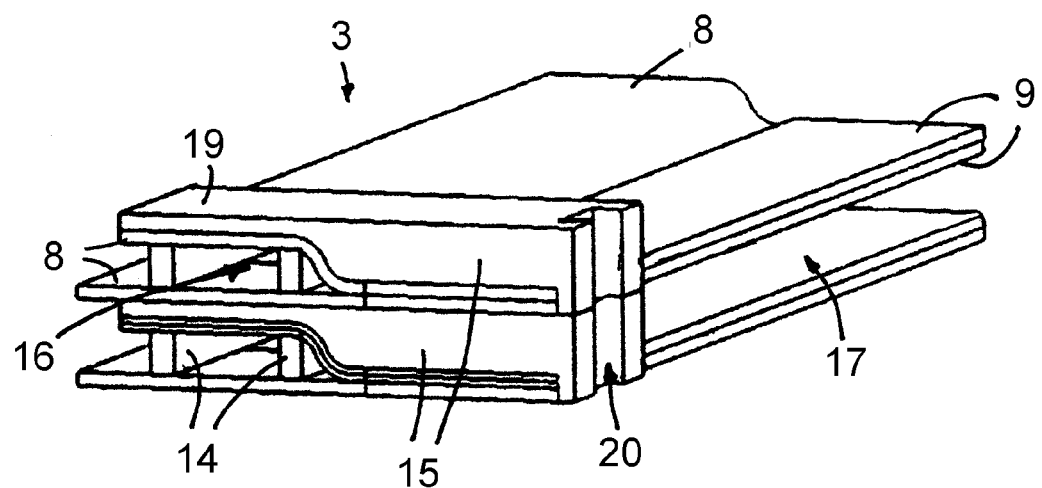
FIG. 6 shows an illustration of a stack unit corresponding to FIG. 3, but with an additional groove-shaped form-fitting contour on the front ends of the sealing strips.

In FIG. 6, an embodiment variant of the cartridge 3 with the stack unit is illustrated, wherein the sealing strips 15 have at each of their front ends a form-fitting contour in the form of a form-fitting groove 20 which extends in the vertical direction. This results in a vertically continuous groove which serves for a form-fitting securing in the receiving housing, on the inner wall of which a corresponding projection is attached. The projection on the inner housing wall of the receiving housing as well as the form-fitting groove 20 on the front end of the sealing strips 15 extends in the vertical direction so that the stack unit can be inserted into the housing vertically from top down, and in doing so, the projection on the inner housing wall comes into engagement with the form-fitting groove 20 on the front end of the sealing strips 15.

What is claimed is:

1. A humidifier for a fuel cell comprising:
at least one stack unit including
a plurality of membranes permeable to water vapor, which are arranged one above the other and spaced apart from one another;
wherein two directly adjacent membranes are connected at a first edge region in a flow-tight manner; and
wherein at a second edge region of the two adjacent membranes, which is angularly offset from the first edge region, sealing strips (15) are arranged which are placed one above the other and between which the membranes are placed;
wherein flow openings are formed between the sealing strips placed one above the other.

2. The humidifier according to claim 1, wherein the sealing strips have a tapering cross-sectional profile.

3. The humidifier according to claim 1, wherein two membranes are placed spaced apart between two sealing strips placed one above the other, which membranes are connected at the angularly offset edge region in a flow-tight manner.

4. The humidifier according to claim 3, wherein spacers are arranged between the membranes between sealing strips placed one above the other.

5. The humidifier according to claim 3, wherein the spacers form a spacer grid.

6. The humidifier according to claim 3, wherein the spacers are formed on a flow-guiding manner and guide the flow in a flow channel in which the spacers are arranged, from the inflow side to the outflow side.

7. The humidifier according to claim 1, wherein
at least one membrane of the plurality of membranes is fixedly secured, adhesively bonded or welded, directly to a sealing strip.

8. The humidifier according to claim 7, wherein
the sealing strip has a contoured side to which the membrane is secured.

9. The humidifier according to claim 8, wherein
a form-fitting contour configured and adapted for connecting to a humidifier housing in which the stack unit can be inserted, is incorporated in a front end of the sealing strip.

10. The humidifier according to claim 9, wherein
the form-fitting contour is formed as a vertically extending form-fitting groove or as a form-fitting projection.

11. The humidifier according to claim 3, further comprising
enclosing parts enclosing, at least in sections, the two membranes connected at the one edge region in a flow-tight manner.

12. The humidifier according to claim 11, wherein
each enclosing part comprises two foils which enclose the membrane.

13. The humidifier according to claim 11, wherein
the enclosing parts of adjacent membranes are secured to each other by welding.

14. The humidifier according to claim 12, wherein
between a foil of the two foils and the membrane, a support grid is welded at least on one side.

15. The humidifier according to claim 14, wherein
the support grid covers at least 30 percent of the membrane area.

16. A fuel cell, wherein
the fuel cell comprises a humidifier according to claim 1.

* * * * *